United States Patent [19]
Takaki

[11] Patent Number: 5,284,230
[45] Date of Patent: Feb. 8, 1994

[54] VENTILATED DISC UNIT FOR AUTOMOTIVE BRAKE SYSTEM

[75] Inventor: Kiyoaki Takaki, Aichi, Japan

[73] Assignee: Aisin Takaoka Co., Ltd., Toyota, Japan

[21] Appl. No.: 903,286

[22] Filed: Jun. 24, 1992

[30] Foreign Application Priority Data

| Jun. 25, 1991 | [JP] | Japan | 3-250155 |
| Jun. 25, 1991 | [JP] | Japan | 3-250156 |
| Dec. 6, 1991 | [JP] | Japan | 3-360772 |
| Dec. 11, 1991 | [JP] | Japan | 3-360858 |

[51] Int. Cl.⁵ ............................................. F16D 65/12
[52] U.S. Cl. ....................... 188/218 XL; 192/113 AF
[58] Field of Search ........ 188/218 R, 218 XL, 264 A, 188/264 AA; 192/113 AF, 113 AG, 107 R

[56] References Cited

U.S. PATENT DOCUMENTS

| 2,451,709 | 10/1948 | Baselt | 188/264 A |
| 3,314,509 | 4/1967 | Pelikan | 192/113 AF |
| 3,394,780 | 7/1968 | Hodkinson | 188/218 XL |
| 3,809,192 | 5/1974 | Stehle | 188/264 AA X |
| 4,164,993 | 8/1979 | Kobelt | 188/264 AA X |
| 4,928,798 | 5/1990 | Watson et al. | 188/264 AA X |

FOREIGN PATENT DOCUMENTS

| 291430 | 11/1988 | European Pat. Off. | 188/218 XL |
| 2257176 | 5/1974 | Fed. Rep. of Germany | 188/218 XL |
| 3740311 | 6/1989 | Fed. Rep. of Germany | 188/218 Xl |
| 2-21342 | 2/1990 | Japan | . |
| 2-38107 | 10/1990 | Japan | . |
| 2024966 | 1/1980 | United Kingdom | 188/264 AA |

*Primary Examiner*—Andres Kashnikow
*Assistant Examiner*—Alfred Muratori
*Attorney, Agent, or Firm*—Burns, Doane, Swecker & Mathis

[57] ABSTRACT

A ventilated disc unit includes inner and outer annular discs coaxially coupled to each other by rib units having bifurcated outer ends, and a rib unit comprising a radially extending straight segment extending towards an inner periphery and a pair of bifurcated segments which are arranged symmetrically with respect to the straight segment so as to open towards outer ends thereof. The straight segment is discontinuous with the bifurcated segments. A plurality of grooves are disposed extending in a radial direction on inner surfaces of the inner and outer annular discs from the inner periphery of the annular discs to the middle of the annular discs. The disc unit produces increased air flow which assures efficient cooling of the discs, particularly bifurcated point areas thereof.

14 Claims, 7 Drawing Sheets

VENTILATED DISC UNIT FOR AUTOMOTIVE BRAKE SYSTEM

BACKGROUND OF THE INVENTION

1. Field of the Invention

This invention relates to a ventilated disc unit for a brake system adapted for an automotive vehicle or an industrial vehicle.

2. Discussions of the Related Art

One ventilated disc unit is disclosed in JP Utility Model Kokoku No. H 2-38107 (1990). As for this ventilated disc unit, an inner disc and an outer disc are formed as a flat annular member, respectively, with the inner disc having a sliding surface smaller in area than that of the outer disc. The inner and outer discs are interconnected by a large number of radially extending ribs having bifurcated outer ends. Between the inner and the outer disks, a large number of radially extending ventilation passages are formed between the adjoining ribs.

With this type of conventional ventilated disc unit, a large quantity of fresh air is drawn via inner ends of the ventilation passages during rotation of the disc unit for forced ventilation within the ventilation passages before being discharged via outer ends thereof into the ambient atmosphere. This ventilated disc unit has, however, a drawback that the inside of the bifurcated ribs are cooled insufficiently.

JP Utility Model Kokai Publication No. H 2-21342 discloses a ventilated disc unit in which the bifurcated outer ends are formed discontinuously from the radially extending rib as compared with JP U.M. Kokoku No. H 2-38107.

However, it has turned out that there is still much to be desired as to the cooling of the bifurcated point area, i.e., proximity including the bifurcated point.

SUMMARY OF THE INVENTION

In view of the above described problem of the related art, it is an object of the present invention to provide an improved ventilated disc unit in which the bifurcated point area of the rib may be cooled more satisfactorily.

Other objects will become apparent in the entire disclosure.

The present invention provides a ventilated disc unit comprising:

an inner annular disc and an outer annular disc coaxially coupled to said inner disc by a plurality of radially extending rib units having bifurcated outer ends, each of said rib units comprising a radially extending straight segment extending towards radially inner periphery of the inner and outer discs and a pair of bifurcated segments extending towards radially outer periphery of the discs, said bifurcated segments being arranged on both sides of and symmetrically with respect to a radial line passing through said straight segment so that a circumferential distance between said bifurcated segments is increased from radially inner ends towards radially outer ends thereof, the straight segment of each rib unit being formed discontinuously with said bifurcated segments via a discontinuously bifurcated point area, wherein a plurality of grooves are disposed extending in a substantially radial direction on inner surfaces of the inner and outer annular discs from the inner periphery of the annular discs substantially to the middle of the annular discs.

With the above described arrangement of the ventilated disc unit of the present invention, a large quantity of air is drawn into the ventilation passages at the radially inner ends thereof no matter in which direction the disc is rotated. The air then travels forcibly along the rib units (i.e., rib segments) due to the centrifugal force exerted to the air before being discharged into ambient atmosphere at the outer ends of the ventilation passages.

Above all, since the bifurcated segments of the ribs are discontinuous to the straight segment thereof, the free bifurcated point area including the inner side of the bifurcated segments may be cooled sufficiently together with the outer area of the straight segments by increased air flowing through the ventilation passages, particularly through grooves, to thereby enhance the cooling effect of the inner and outer annular discs. Thus, heat accumulation at the bifurcated point area is avoided.

In the following, preferred embodiments of the present invention will be summarized.

The grooves disposed on the inner surface of the inner annular disc open with their inner ends extending to the inner periphery of the inner annular disc. This structure allows efficient take-in of air into the ventilation passages.

The aforementioned plurality of grooves include those grooves whose radially outer ends are directed toward and end close to the discontinuously bifurcated point area.

The grooves directed toward the discontinuously bifurcated point area are disposed on both the sides of the straight segment of any one of the ribs. These two means assure the most efficient cooling operation of the grooves for the discontinuously bifurcated point area.

The plurality of grooves further comprise those grooves which are disposed in a space between adjoining straight segments. This measure promotes further increased air flow and cooling.

The plurality of grooves include those grooves having a cross-section which decreases toward the radially outer direction. This groove structure permits the highest take-in of air as well as pressurization along the radially outer direction as the air flows through the centrifugal force produced by rotation of the disc unit.

A columnar rib (or stud-like rib) which connects both the inner and outer annular discs is disposed in a space between adjoining rib units. Any one of the columnar ribs is provided with a pair of grooves which extend substantially in a radially outer direction sandwiching the columnar rib on inner surfaces of the inner and outer annular discs.

The toughness of the disc unit as well as its cooling effect may be improved by a number of columnar ribs interposed between the inner and the outer discs to permit a larger braking force to be developed.

The inner surfaces of the inner and outer annular discs are increased in area by the grooves formed on both sides of the ribs and the stud-like ribs. The opening of the grooves in the center bore of the annular discs enhances the cooling effect of the disc unit, too.

According to the present invention, by forming the bifurcated segments of the ribs discontinuously to the straight segments, by forming grooves on the inner surfaces of the inner and outer annular discs extending from the inner ends to the middle part of the inner surfaces of the annular discs, (and further by providing the stud-like ribs at the radially middle part of the inner surfaces), the cooling effect may be improved significantly.

Besides, an optimum cooling effect may be displayed no matter whether the vehicle is moved in the forward direction or in the reverse direction, or whether the ventilating disc unit is mounted on the front wheels or on the rear wheels of the vehicle, without regard to the position on the front or rear wheels at which the ventilation disc unit is mounted.

In addition, a stable braking effect is obtained because a braking force having the same constant magnitude throughout all times may be developed in each of the ventilated disc units mounted on the vehicle.

DESCRIPTION OF PREFERRED EMBODIMENTS

Figure 1:
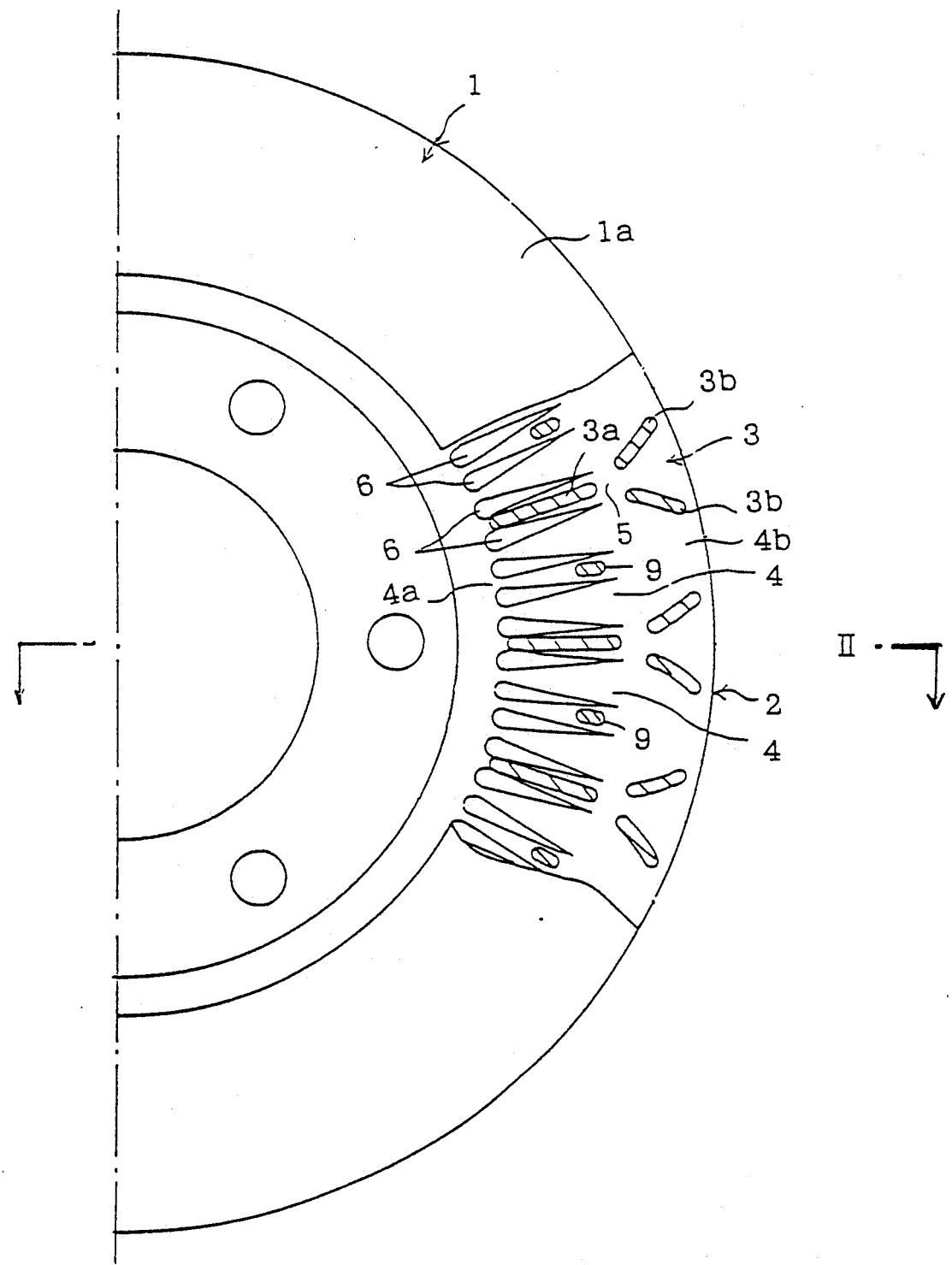
FIG. 1 is a front view, partially broken away, showing an embodiment of a ventilated disc unit according to the present invention.
Figure 2:
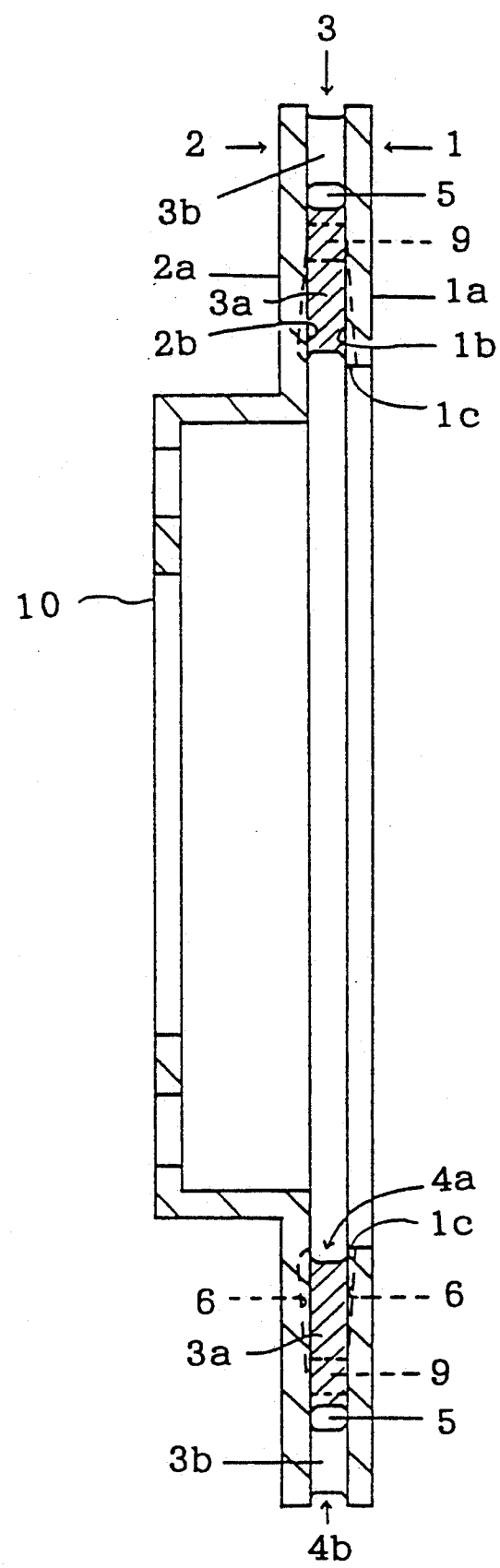
FIG. 2 is a cross-sectional view taken along a line II of FIG. 1.

In FIGS. 1 and 2, there is shown a ventilated disc unit according to a preferred embodiment of the present invention. The disc unit is comprised of an inner annular disc 1 and an outer annular disc 2 integrally connected to the inner disc 1 by a large number of radially extending rib units 3. The inner peripheral rim of the outer disc 2 is integrally formed with a bottomed cylindrical hub 10. A large number of radially extending ventilation passages 4 are formed between the adjoining rib units 3 within a space between the annular discs 1 and 2. The inner disc 1, which has an outer diameter equal to that of the outer disc 2, has an inner diameter larger than that of the outer disc 2, so that the inner disc 1 has a sliding surface 1a which is lesser in area than a sliding surface 2a of the outer disc 2.

Each rib unit 3 is made up of a straight segment 3a, extending radially on the inner surfaces of the discs 1 and 2, and a pair of substantially bifurcated segments 3b, 3b arranged symmetrically on both sides of the straight segment 3a towards the outer peripheral rims of the discs 1 and 2 so that radially outer ends of the bifurcated segments are spaced apart at a larger distance from each other than radially inner ends thereof.

In the present specification, "bifurcated segments" means that the segments diverge in a bifurcated manner (referred to as "bifurcated point area") without being connected at a radially inner root portion, so that the segments are separated from each other not only at the radially outer end portions but also at the radially inner root portion. The radially outer end of the straight segment 3a of the rib unit 3 and the radially inner ends of the bifurcated segments 3b are discontinuous to one another, so that a channel 5 (i.e., free bifurcated point area) is defined therebetween.

A stud-like rib 9 is provided between the discs 1 and 2 and at a circumferentially equidistant position between the straight segments 3a of the neighboring rib units 3.

On an inner surface 1b of the disc 1 and on an inner surface 2b of the disc 2, there are formed a number of pairs of grooves 6 associated with each straight segment 3a of the rib unit 3 and each stud-like rib 9.

Grooves 6 formed as a pair are arranged on both sides of the associated straight segment 3a and on each side of the associated stud-like ribs 9, and are extended radially from the inner peripheral side as far as substantially the middle positions of the annular discs 1, 2. Each groove 6 is in the form of a half cone (or a semi-cone) having its apex (or thin portion) directed towards the radially outer side of the discs 1, 2 so that the cross-section becomes increasingly thinner from the radially inner side towards the radially outer side of the discs. Particularly, grooves 6 which are disposed on the inner surface of the inner disc 1 have open ends 1C at their inner ends.

Since the cross-sectional area of the groove 6 is larger in this manner at the radially inner end than at the radially outer end thereof, since the grooves 6 have the open ends 1C on the inner surface of the inner disc 1 and also since the radially outer end of the bifurcated segment 3b of the rib unit 3 approaches the radially outer end of the bifurcated segment 3b of the neighboring rib unit 3, a radially inner opening end 4a of each ventilation passage 4 has an area larger than that of its radially outer opening end 4b.

Besides, the inner surfaces of the discs 1 and 2 are increased in area due to the presence of the semiconical grooves 6, while the stud-like ribs 9 lead to increased toughness of the ventilated disc unit.

Meanwhile, in the embodiment shown in FIG. 1, the bifucated segments 3b of each rib unit 3 are bent in contour so that the inner sides thereof facing each other present convex surfaces.

Figure 3:
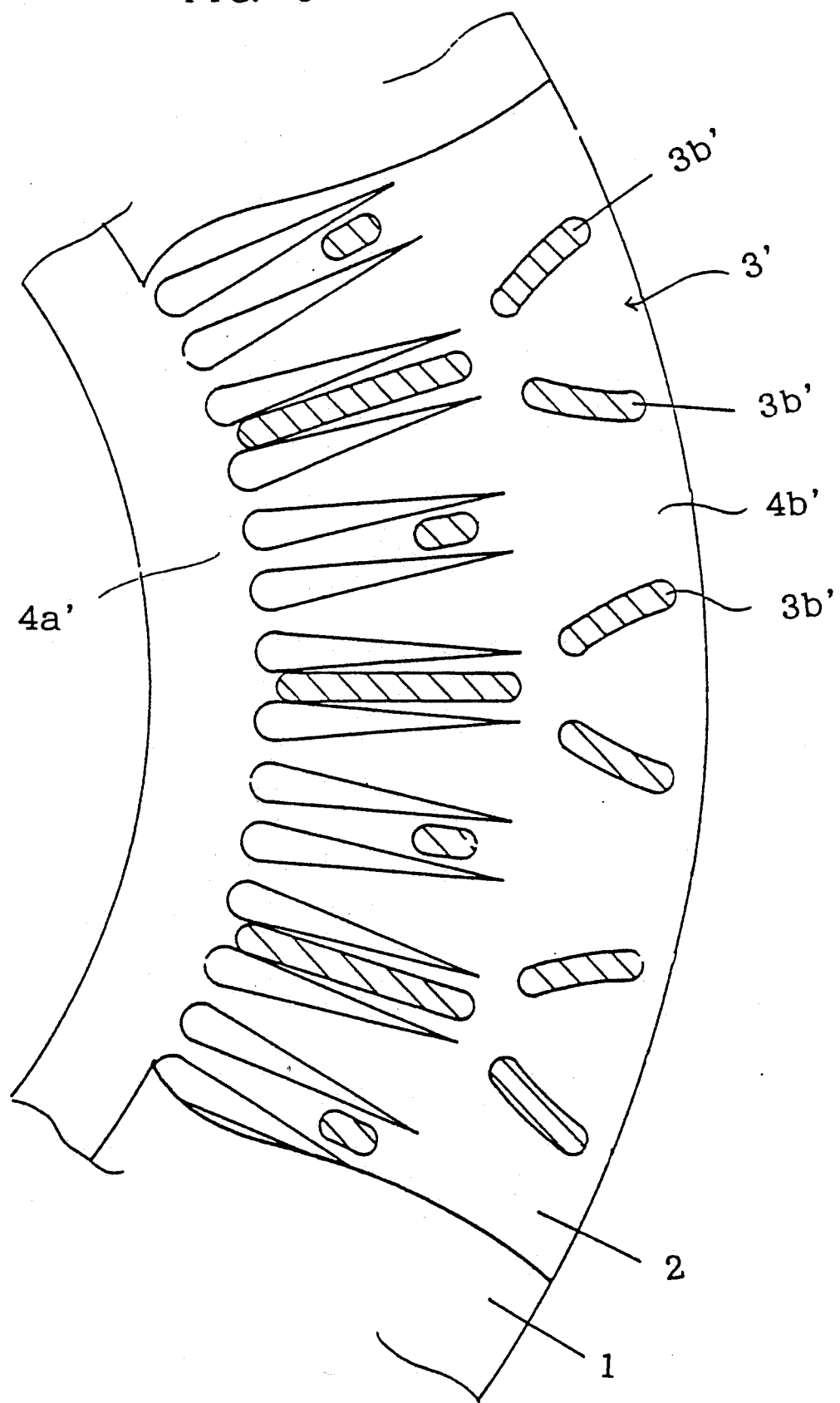
FIG. 3 is a front view, partially broken away, showing another embodiment of the ventilated disc unit according to the present invention.
Figure 4:
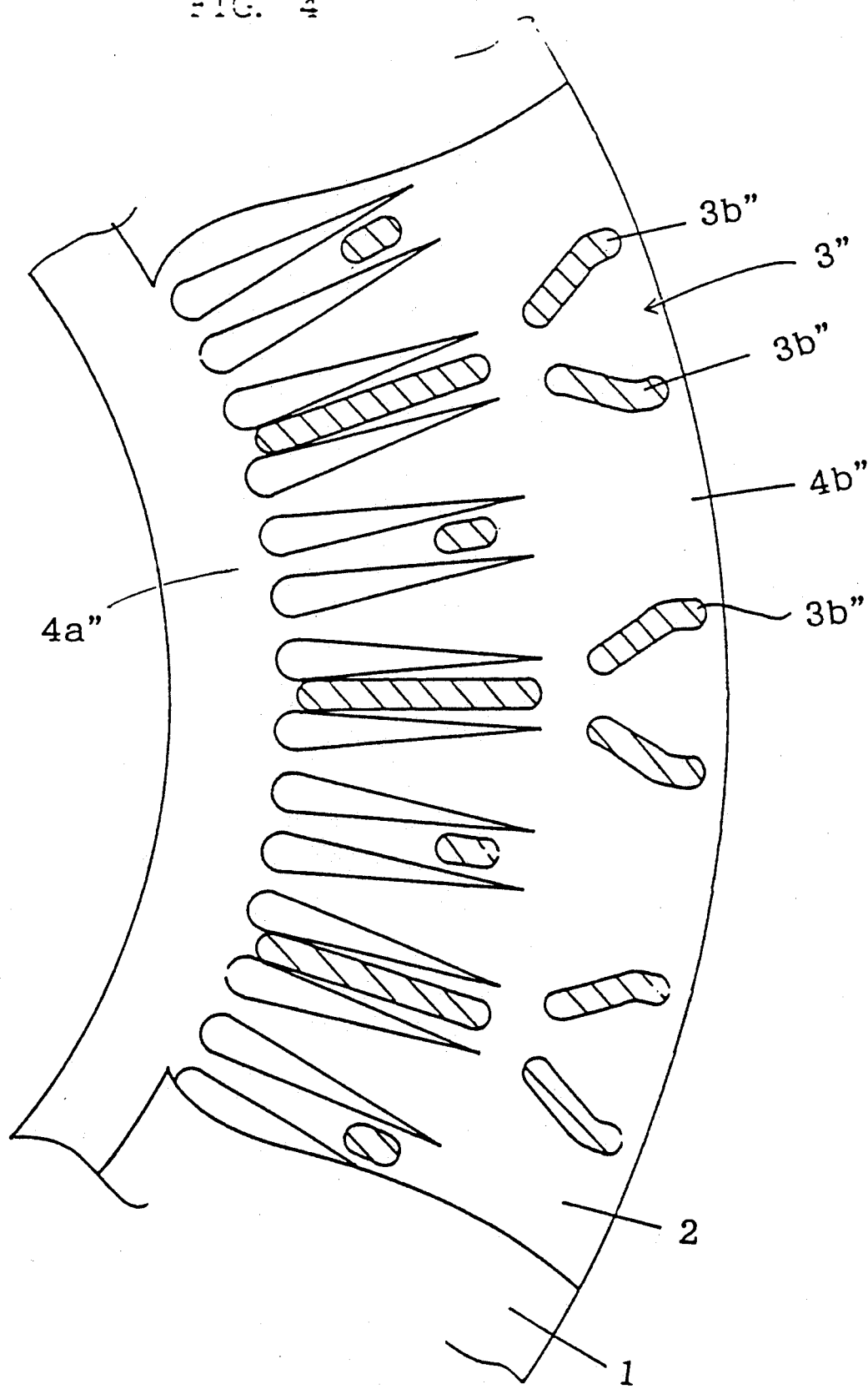
FIG. 4 is a front view, partially broken away, showing still another embodiment of the ventilated disc unit according to the present invention.

FIGS. 3 and 4 show modified embodiments of the ventilated disc unit according to the present invention.

Thus, FIG. 3 shows a modification in which bifurcated segments 3b' of each rib unit 3' are bent in contour so that the inner sides of the bifurcated segments 3b' facing each other present concave surfaces, and FIG. 4 shows another modification in which the bifurcated segments 3b'' of each rib unit 3'' are bent back towards each other in contour at the radially outer ends thereof. 4a', 4a'' represent inner opening ends, while 4b', 4b'' represent outer opening ends. The arrangements shown in FIGS. 3 or 4 are otherwise the same as that shown in FIG. 1, so that the same numerals are used to denote the same or equivalent parts.

In the embodiments shown in FIGS. 3 and 4, the outer opening ends 4b', 4b'' between the bifurcated segments 3b', 3b'' of the two adjoining rib units 3', 3'' are larger in area than the case with the embodiment shown in FIG. 1, so that the amount of air flowing in the space between the two adjoining rib units 3', 3'' is increased.

When the disc 1 of the present invention is rotated in a desired direction, a large amount of air is sucked into the ventilation passages 4 via the inner opening ends 4a, 4a', 4a'' and is caused to flow along the rib units 3 before being discharged at the outer opening ends 4b, 4b', 4b'' under the centrifugal force for air cooling the inner disc 1 and the outer disc 2. Above all, since the straight segments 3a, 3a' and 3a'' are not continuous to, but are physically separated from the bifurcated segments 3b, 3b' and 3b'', air sucked from the inner opening ends 4a, 4a', 4a'' is caused to flow into regions defined between the bifurcated segments 3b, 3b', and 3b'', via the free, open channel 5 of the bifurcated point area, to cool these regions sufficiently. Cooling of the discs 1, 2 may also be achieved via the stud-like ribs 9 provided within the airflow passages. The disc unit may also be improved in toughness by virtue of these stud-like ribs 9 so that a larger braking power may be achieved.

Figure 5:
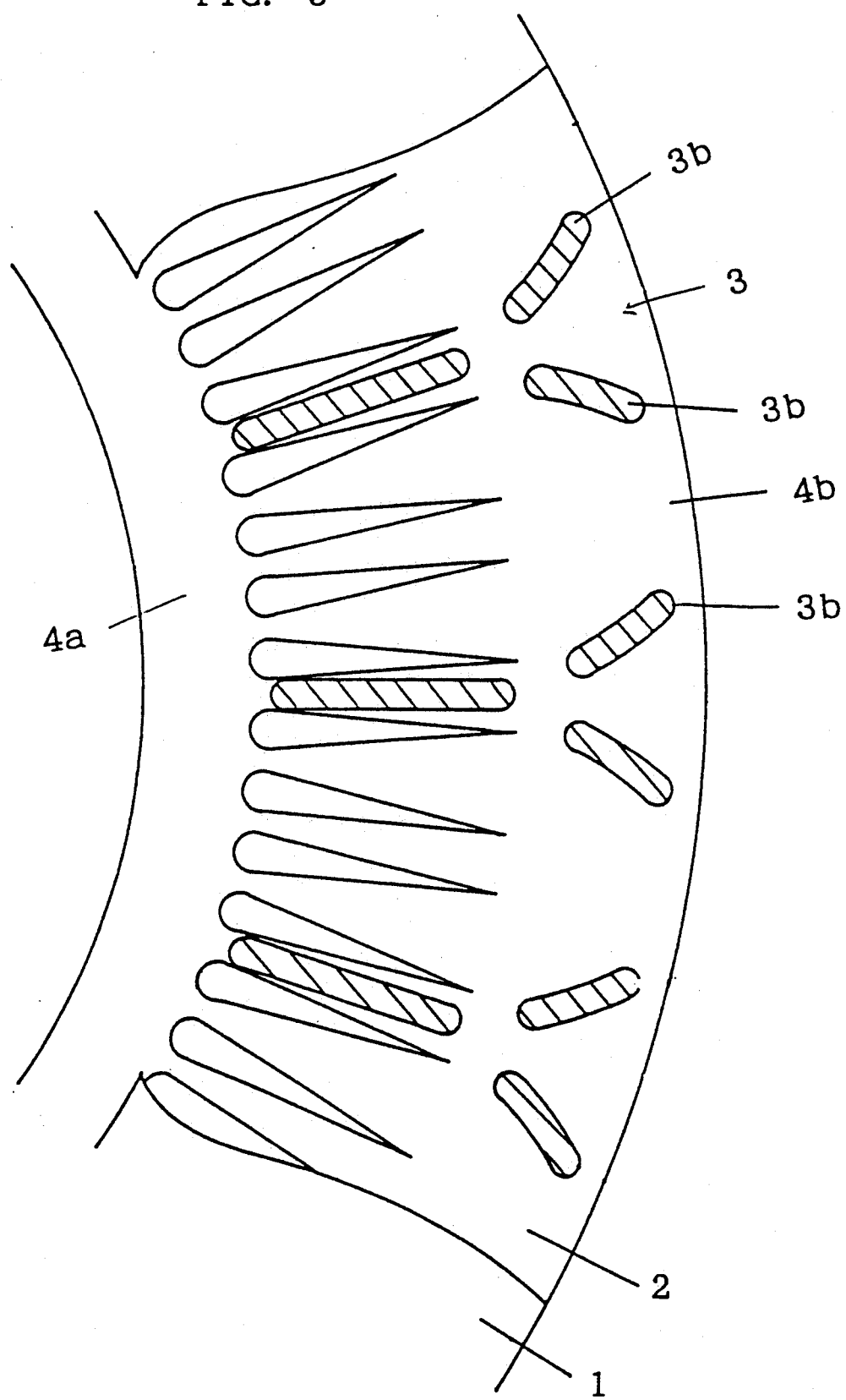
FIGS. 5-7 show further embodiments of the present invention, partially broken away.
Figure 6:
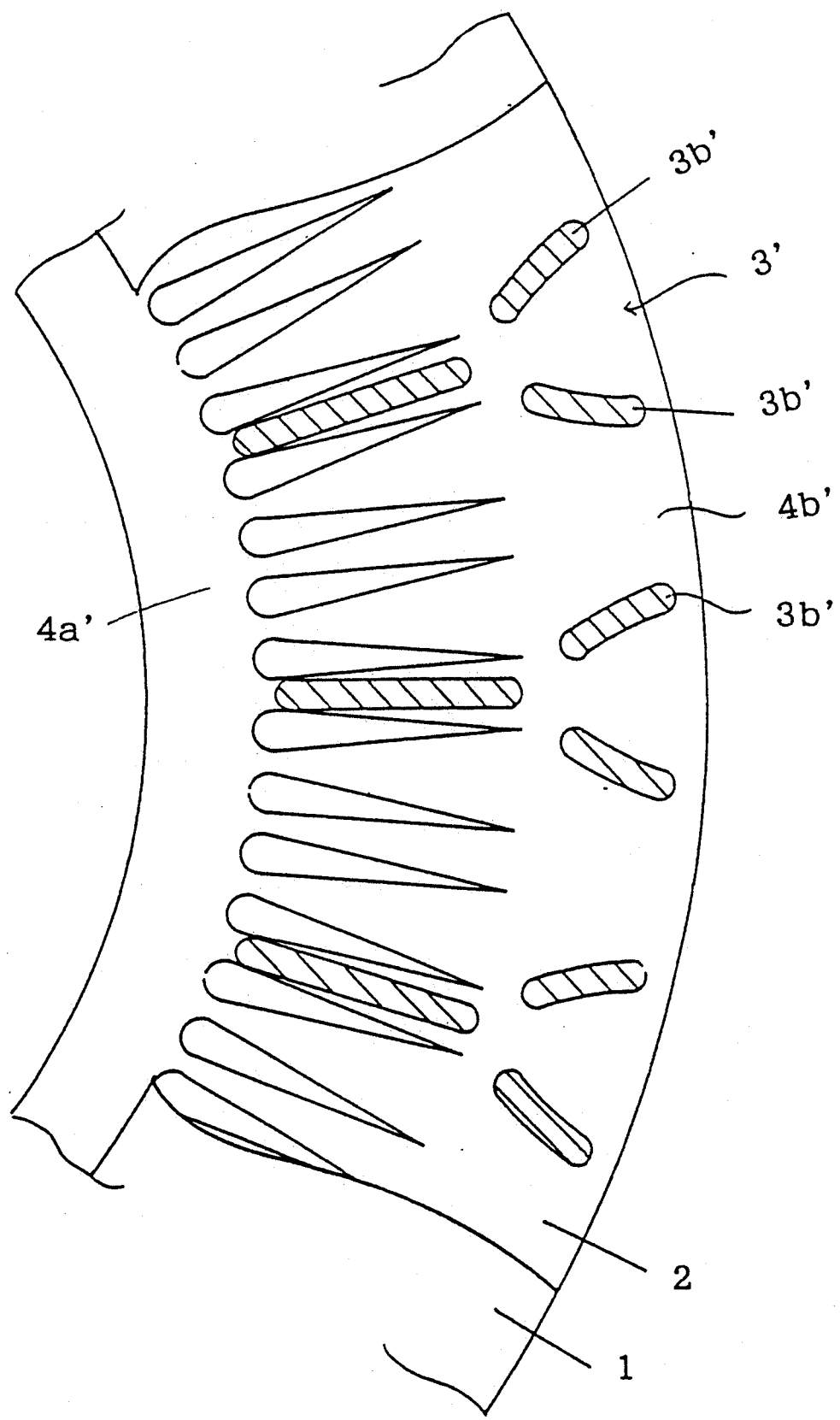
Figure 7:
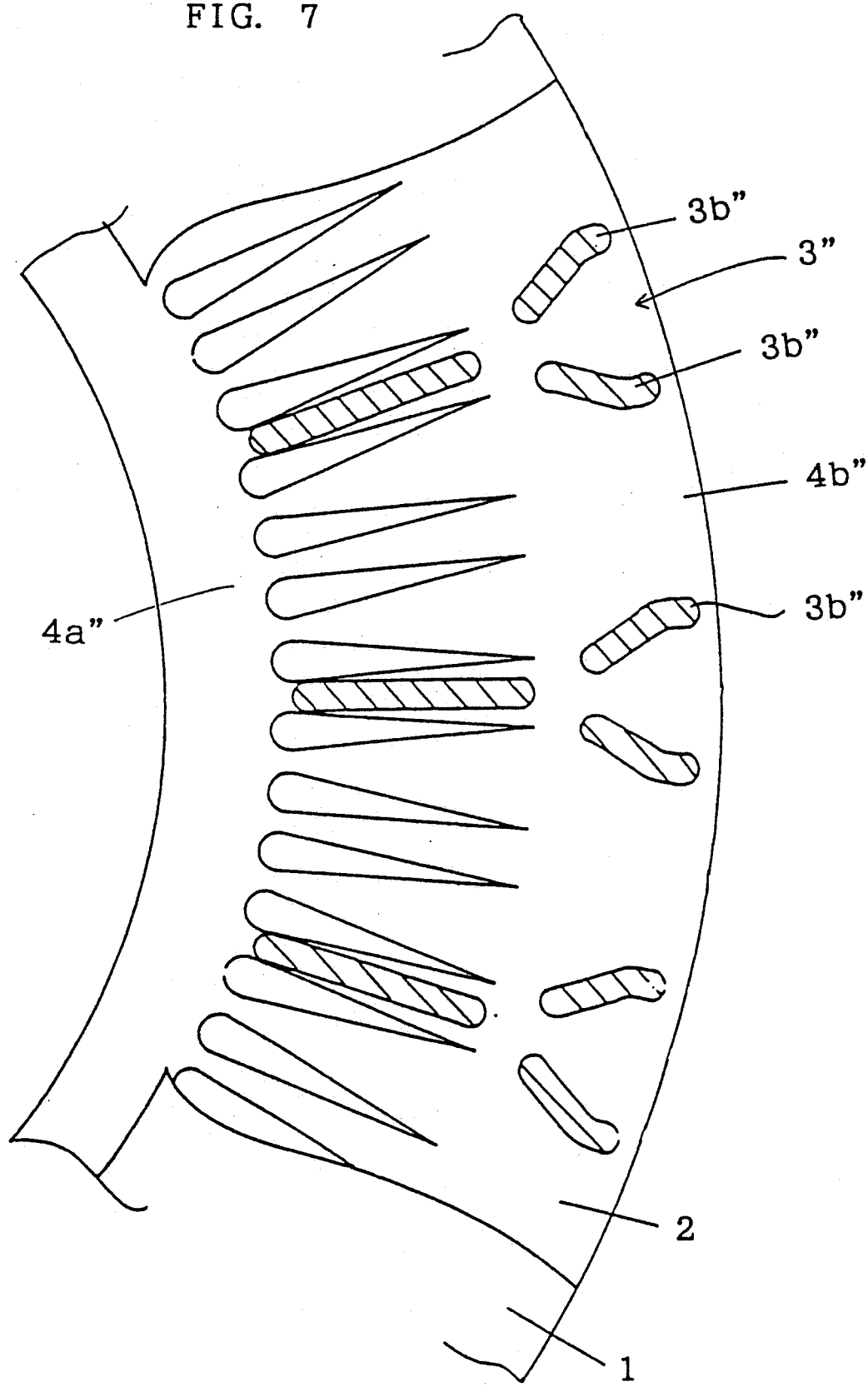

FIGS. 5 to 7 disclose embodiments which have no stud-like ribs 9. These embodiments suffer a small decrease in toughness of the ventilated disc unit, but still exhibit substantially satisfactory cooling effect.

Generally, the arrangement of ribs and grooves should be made under consideration of rotational balance.

It should be noted that modifications obvious in the art can be made without departing from the gist of the present invention as herein disclosed and claimed hereinbelow.

What is claimed is:

1. A ventilated disc unit comprising:
   an inner annular disc and an outer annular disc coaxially coupled to said inner disc by a plurality of radially extending rib units having bifurcated outer ends,
   each of said rib units comprising a radially extending straight segment extending towards radially inner periphery of the inner and outer discs and a pair of bifurcated segments extending towards radially outer periphery of the discs,
   said bifurcated segments being arranged on both sides of and symmetrically with respect to a radial line passing through said straight segment so that a circumferential distance between said bifurcated segments is increased from radially inner ends towards radially outer ends thereof,
   the straight segment of each rib unit being formed discontinuously with said bifurcated segments via a discontinuously bifurcated point area,
   wherein a plurality of grooves are disposed extending in a substantially radial direction on inner surfaces of the inner and outer annular discs from the inner periphery of the annular discs substantially to the middle of the annular discs.

2. The ventilated disc unit as defined in claim 1, wherein said grooves disposed on the inner surface of the inner annular disc open with their inner ends extending to the inner periphery of the inner annular disc.

3. The ventilated disc unit as defined in claim 1, wherein said plurality of grooves include grooves whose radially outer ends are directed toward and end close to said discontinuously bifurcated point area.

4. The ventilated disc unit as defined in claim 3, wherein said grooves directed toward the discontinuously bifurcated point area are disposed on both sides of the straight segment of any one of the ribs.

5. The ventilated disc unit as defined in claim 4, wherein said plurality of grooves further comprise grooves which are disposed in a space between adjoining straight segments.

6. The ventilated disc unit as defined in claim 4, including columnar ribs each of which connects both the inner and outer annular discs and which is disposed in a space between adjoining rib units.

7. The ventilated disc unit as defined in claim 6, wherein any one of said columnar ribs is provided with a pair of grooves which extend substantially in a radially outer direction sandwiching the one columnar rib on inner surfaces of the inner and outer annular discs.

8. The ventilated disc unit as defined in claim 7, wherein said grooves are substantially in a form of a halfcone having a thin outer end portion, and said one of said columnar ribs is disposed in a space between adjoining thin portions of the grooves.

9. The ventilated disc unit as defined in claims 1, wherein said plurality of grooves include grooves having a cross-section which decreases toward the radially outer direction.

10. The ventilated disc unit as defined in claim 1, wherein the inner sides facing each other of said a pair of bifurcated segments of any one of the rib units are formed convex.

11. The ventilated disc unit as defined in claim 1, wherein inner sides facing each other of said a pair of bifurcated segments of any one of the rib units are formed concave.

12. The ventilated disc unit as defined in claim 1, wherein outer ends of said a pair of bifurcated segments of any one of the rib units are bent toward each other.

13. The ventilated disc unit as defined in claim 1, wherein a stud-like rib of a short radial length interconnecting the inner and outer annular discs is formed between adjoining rib units.

14. The ventilated disc unit as defined in claim 13, wherein a pair of grooves are disposed on both sides of said stud-like rib on inner surfaces of the inner and outer annular discs, said pair of grooves extending substantially in a radial direction.

* * * * *